(12) United States Patent
Lundquist

(10) Patent No.: US 6,624,612 B1
(45) Date of Patent: Sep. 23, 2003

(54) SYSTEM AND METHOD TO FACILITATE VOLTAGE BALANCING IN A MULTI-CELL BATTERY

(75) Inventor: David Lundquist, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/020,724

(22) Filed: Oct. 30, 2001

(51) Int. Cl.[7] .............................................. H01M 10/46
(52) U.S. Cl. ...................................... 320/118; 320/133
(58) Field of Search ................................. 320/104, 103, 320/116, 118, 119, 120, 122, 123, 133

(56) References Cited

U.S. PATENT DOCUMENTS

| | | | |
|---|---|---|---|
| 3,930,192 A | * | 12/1975 | Dinkler |
| 5,546,003 A | | 8/1996 | Noworolski et al. |
| 5,646,503 A | | 7/1997 | Stockstad |
| 5,773,159 A | | 6/1998 | Beard |
| 5,886,502 A | | 3/1999 | Higashijima |
| 5,998,967 A | | 12/1999 | Umeki et al. |
| 6,114,835 A | | 9/2000 | Price |
| 6,121,751 A | | 9/2000 | Merritt |
| 6,181,106 B1 | | 1/2001 | Finger |
| 6,242,970 B1 | | 6/2001 | Grant et al. |
| 6,459,236 B2 | * | 10/2002 | Kawashima |
| 6,462,511 B1 | * | 10/2002 | Kwok |
| 6,518,725 B2 | * | 2/2003 | Marten |

OTHER PUBLICATIONS

"A Review of Cell Equalization Methods for Lithium Ion and Lithium Polymer Battery Systems" by Stephen W. Moore and Peter J. Schneider Copyright 2001 Society of Automotive Engineers, Inc.

* cited by examiner

Primary Examiner—Edward H. Tso
(74) Attorney, Agent, or Firm—Amin & Turocy, LLP

(57) ABSTRACT

A system and method are disclosed to facilitate balancing energy among a plurality of energy cells. Charge is transferred between each respective cell and an associated energy storage device by sequentially coupling the storage device with different cells, such that the energy in each of the cells is transferred from cells having a higher potential energy to cells having a lower potential energy through the energy storage device.

21 Claims, 6 Drawing Sheets

SYSTEM AND METHOD TO FACILITATE VOLTAGE BALANCING IN A MULTI-CELL BATTERY

TECHNICAL FIELD

The present invention relates to energy cells and, more particularly, to a system and method to facilitate voltage balancing in a multi-cell battery.

BACKGROUND OF THE INVENTION

Various battery-powered devices employ multi-cell battery packs as power sources to energize associated electronics. The use of a pack of cells, rather than a single cell, can provide higher voltage delivery or greater capacity through increased amp-hours. However, the voltages on the individual cells tend to become unbalanced over time, such as during storage and/or usage, because each battery cell has its own distinct charging and discharging characteristics. The difference in voltages among cells in a battery pack creates an imbalance condition among the battery cells, which can lead to the loss of capacity in the battery pack. Accordingly, various cell balancing systems have been developed in an effort to balance the individual cells to help prevent overcharging as well as achieve uniform charging of all the battery cells.

Many conventional cell balance systems, for example, require relatively complex control circuitry to controls operation of the associated balancing system. The cell balancing system typically includes an array of sensors that monitor voltages in one or more cells of the battery pack. Further each cell can include its own associated monitoring and control circuit. Additionally, balancing often is achieved by discharging selected cells through a resistor. Therefore, the power requirements necessary to control and operate a conventional cell balancing system for a multi-cell battery pack can be significant. As the power requirements for the cell balancing system increase, the incremental benefits tend to decrease proportionally. Additionally, the overhead associated with the combination of components needed to implement most conventional systems increase the resulting cost of the battery pack or charging system.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One aspect of the present invention provides a system for balancing electrical energy of a plurality of energy cells, such as can be connected to form part of a battery pack. The system includes a power transfer system that can connect to each of the battery cells to transfer energy between the connected cell and an associated storage device (e.g., a capacitor). The energy is transferred from the cell or associated storage device having a higher potential to the other storage device or cell having a lower potential. The connection can occur for a predetermined time period or it can be implemented for a duration sufficient to allow the relative potentials of the connected cell and storage device to become substantially equal.

Another aspect of the present invention provides a method for balancing electrical energy among a plurality of energy cells. The method includes repeatedly connecting and disconnecting each of the plurality of energy cells relative to an energy storage device. The method can continue indefinitely. Alternatively, the method can be terminated after the cells are sufficiently balanced and then reinitiated after the cells go imbalanced.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention provides a system and method for balancing voltage and thus energy across a plurality of interconnected energy cells. Charge is transferred between each respective cell and an associated energy storage device. The associated energy storage device is sequentially coupled to different cells such that the energy in each of the cells is transferred from cells of a higher potential to cells having a lower potential through the energy storage device. As a result, the potential energy in the respective cells is driven to balanced condition over time.

Figure 1:
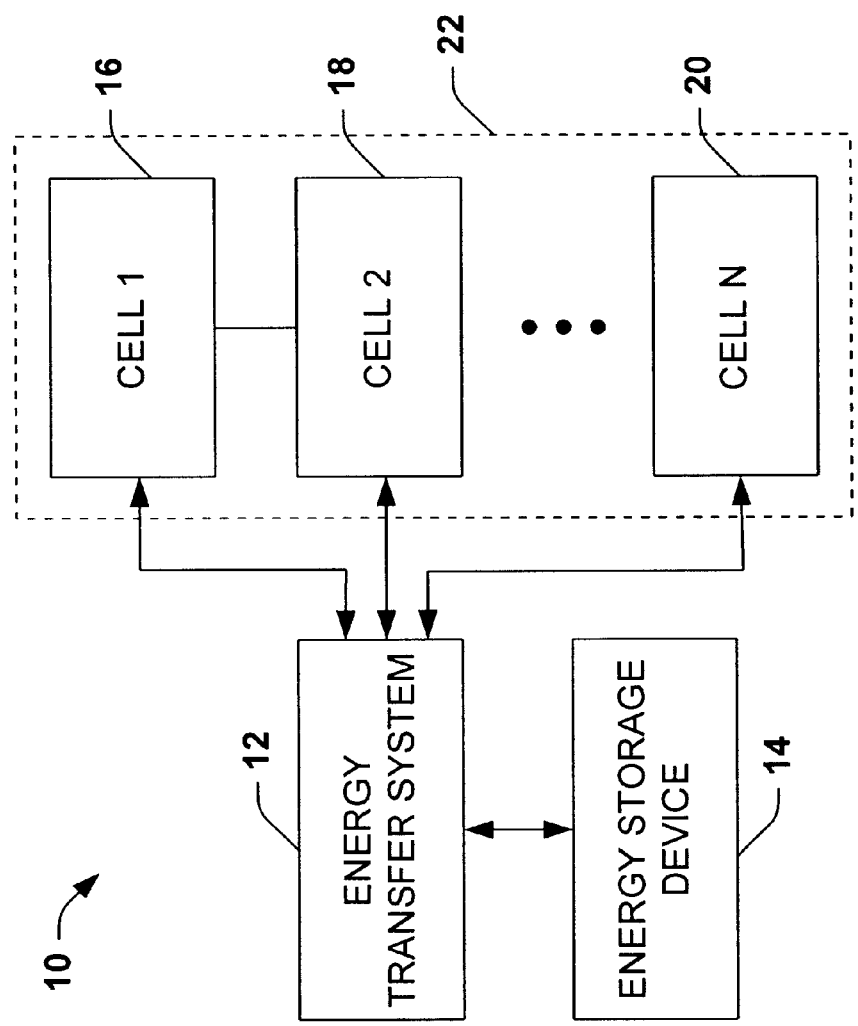
FIG. 1 is a functional block diagram of a cell balancing system in accordance with an aspect of the present invention.

FIG. 1 illustrates a cell balancing system 10 in accordance with an aspect of the present invention. The system 10 includes a energy transfer system 12 connected between an energy storage device 14 and a plurality of (e.g., two or more) energy cells 16, 18, and 20. While for purposes of brevity three energy cells 16, 18 and 20 are illustrated in FIG. 1, it is to be understood and appreciated that any number of two or more cells could be utilized in a system in accordance with an aspect of the present invention. The energy transfer system 12 can be any network or system programmed and/or configured to electrically connect the energy storage device 14 with a selected one or more of the cells 16, 18, 20 so as to permit a transfer of energy between the storage device and the connected cell(s). For example, the energy transfer system 12 can connect the energy storage device with a different one of the cells 16, 18 or 20 for a predetermined duration, which can be a fixed or variable time period sufficient so as to substantially equalize the voltage potential across the connected components, namely the storage device and the connected cell.

The energy cells 16, 18 and 20, for example, are battery cells interconnected in series, such as to form a multi-cell stack 22. Cell stacks often are utilized in battery packs for use providing power in various types of handheld devices such as, bar code readers, cell phones, web phones, PDAs (Personal Digital Assistants), laptop computers, and other portable electronic devices. The battery cells 16, 18 and 20, for example, are rechargeable Lithium-Ion (Li-ion) batteries. However, it is to be understood and appreciated that the batteries can be of any type (e.g., Nickel-Cadmium (Ni—Cd), Nickel-Metal-Hydride (NiMH), Sealed-Lead-Acid (SLA), Lithium Polymer (Li-Pol)), such as depending upon the application at hand. During charging, use and/or storage, individual battery cells tend to charge or discharge different amounts of electric charge, which lead to the cells having different voltages from one another, namely a charge imbalance.

The system 10 is operative to balance the electrical energy in each of the battery cells 16, 18 and 20 to a common level. In particular, the energy transfer system 12 is operative to progressively connect each of the energy cells 16, 18 and 20 with the associate energy storage device 14. Initially, the storage device 14 can have either no voltage or a predetermined starting voltage, such as a voltage near the voltage desired across each of the cells 16, 18 and 20. The storage device 14 is intermittently connected and then disconnected with each of the cells 16, 18 and 20. When connected with a given cell, electric current flows between the storage device and the given cell in a direction depending on the relative potential between the cell and connected storage device. The current flows until the voltage across the cell and storage device 14 are equal. The current flows until the voltage across the cell and storage device 14 are equal. The energy transfer system can then connect the storage device with a next of the cells. The sequential connecting and disconnecting of each respective cells to the energy storage device can be repeated to balance the electrical energy among the cells 16, 18, and 20.

By way of illustration, assume that the cell 16 has a higher voltage than the cell 18 and the energy storage device 14 and that the cell 20 has the lowest voltage potential. The energy transfer system 12 connects the energy storage device 14 across the cell 16 for a duration, which can be a fixed duration or variable. At this time, the storage device 14 has about the same potential as the cell 16, which is higher than the cell 18. The energy transfer system 12 then disconnects the cell 16 and the storage device 14 and, in turn, connects the storage device to the next cell 18. Some of the charge is transferred from the storage device 14 to the cell 18 having the lower potential, thereby increasing the potential voltage of the cell 18. The energy transfer system 12 then disconnects the energy storage device 14 from the cell 18 and then connects the cell 20 with the storage device. Because, the energy storage device 14 has a higher potential than the cell 20, some energy also is transferred from the storage device to the cell 20 during the connection. Next, the energy transfer system 12 connects the energy storage device 14 back to the first cell 16, which results in energy being transferred from the cell to the storage device. Once the voltage potential across the respective cells 16, 18 and 20 is substantially equal, the process can be terminated. Alternatively, the process can continue indefinitely, although little or no energy transfer will occur because the energy storage device 14 and the cells 16, 18 and 20 have substantially the same voltage potential.

Figures 2, 3:
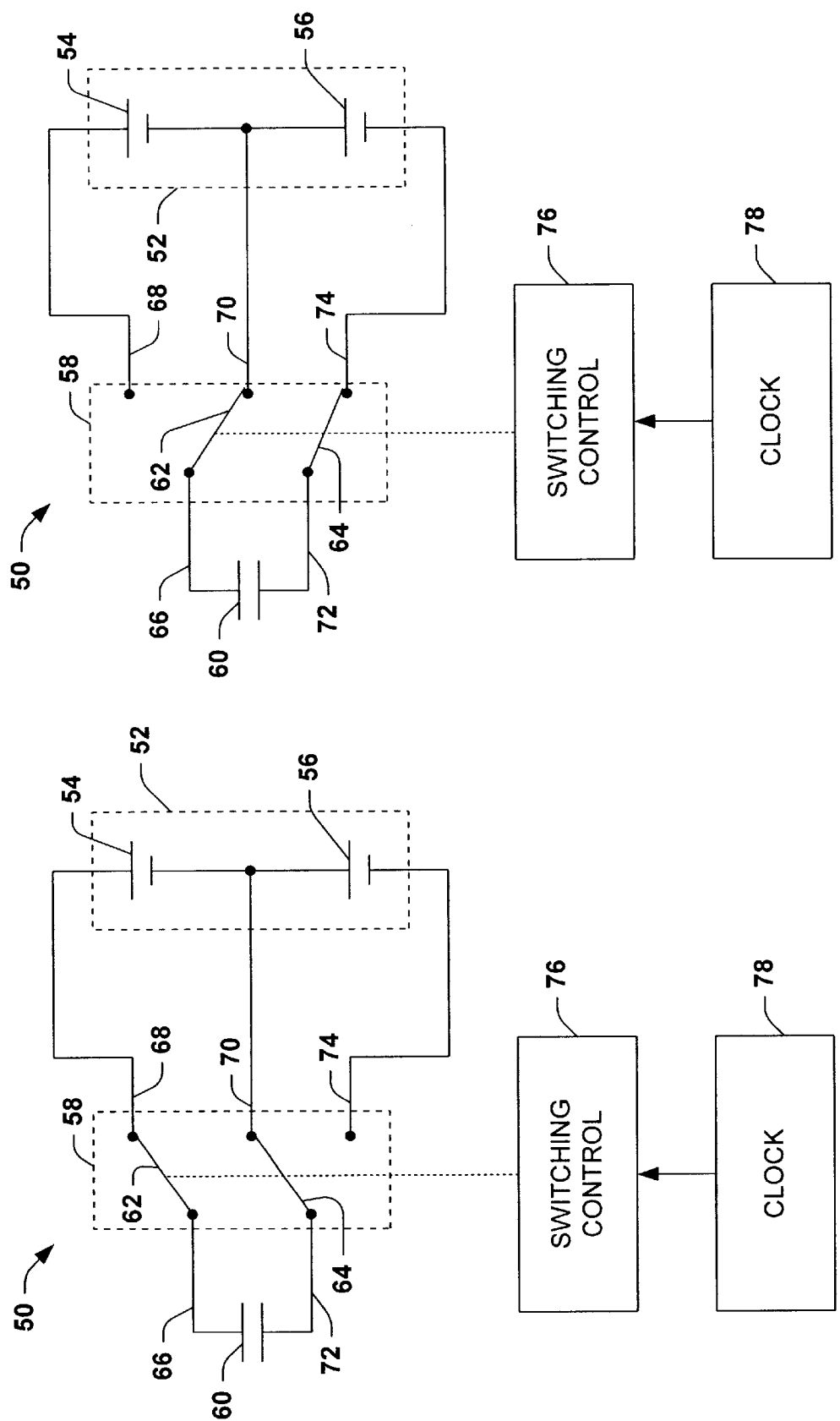
FIG. 2 is an example of a cell balancing system for a multi-cell battery pack, illustrating the system in a first condition in accordance with an aspect of the present invention.
FIG. 3 is an example of a cell balancing system for a multi-cell battery pack, similar to FIG. 2, illustrating the system in a second condition in accordance with an aspect of the present invention.

FIGS. 2 and 3 illustrate an example of a battery system 50 in accordance with an aspect of the present invention. In this example, the system 50 includes a cell stack 52 formed of batteries 54 and 56 connected in series. A switching network 58 is connected between the cell stack 52 and a capacitor 60. The switching network 58 includes a pair of switches 62 and 64 operative to connect the capacitor 60 with a selected one of the batteries 54 and 56. In particular, the switch 62 is connected to a terminal 66 of the capacitor and is operative to connect such terminal to one of terminals 68 and 70 of the cell stack 52. Similarly, the switch 64 is connected to another terminal 72 of the capacitor 60 and operative to connect the terminal to one of the terminals 70 and 74. In the example illustrated in FIGS. 2 and 3 the switch network 58 provides two switching conditions, namely a first condition in which the capacitor is connected across the cell 54 (shown in FIG. 2) and a second condition in which the capacitor is connected across the cell 56 (shown in FIG. 3). Thus, the switching network is operative to progressively switch the capacitor 60 in parallel with a selected cell 54, 56 of the cell stack 52.

Those skilled in the art will understand various components that could be employed to implement the functionality of the switches 62 and 64 of the switch network 58. For example, a pair of respective MOSFET switch devices can be associated with each battery 54, 56 so that when a selected pair of the MOSFETs are activated, the capacitor terminals 66 and 72 are electrically coupled to a respective pair of the battery terminals 68, 70 or 70, 74 for a respective one of batteries 54, 56. Of course, other types of transistors and/or other circuit arrangements can be utilized in accordance with an aspect of the present invention.

The system 50 includes a switching control 76 that is programmed and/or configured to control operation of the switch network 58. The switching control 76, for example, receives a pulsed clock signal from a clock (or timer) 78. The clock 78 can be a stand-alone clock or it can be provided by an associated system, such as a battery gas gauge or other timing circuitry. The switching control 76 selectively activates each switch 62, 64 to a desired switch condition based on the clock signal. In the two battery example in FIGS. 2 and 3, for example, the clock 78 provides a square wave that oscillates between two states (e.g., HIGH and LOW) according to its associated clock frequency (e.g., 32 KHz). When the clock 78 has one state, the switching control 76 can operate the switches 62 and 64 to connect the capacitor 60 across the battery 54 (FIG. 2) and when the clock has the other state, the switches can connect the capacitor across the battery 56 (FIG. 3). Those skilled in the art will understand and appreciate other switching arrangements that could be employed to sequentially connect the storage device 60 mutually exclusively with the cells 54 and 56 in accordance with an aspect of the present invention.

In a system that includes more than two batteries, for example, the switching control 76 could sequentially switch the capacitor across each of such batteries based on each clock pulse (or each change in clock signal). Alternatively or additionally, other sequencing arrangements (e.g., a predefined sequence depending on the configuration of battery pack, a counter having a different count values for each connection, etc.) could be used to intermittently connect the capacitor across different ones of the battery cells of the cell stack 52.

Figure 4:
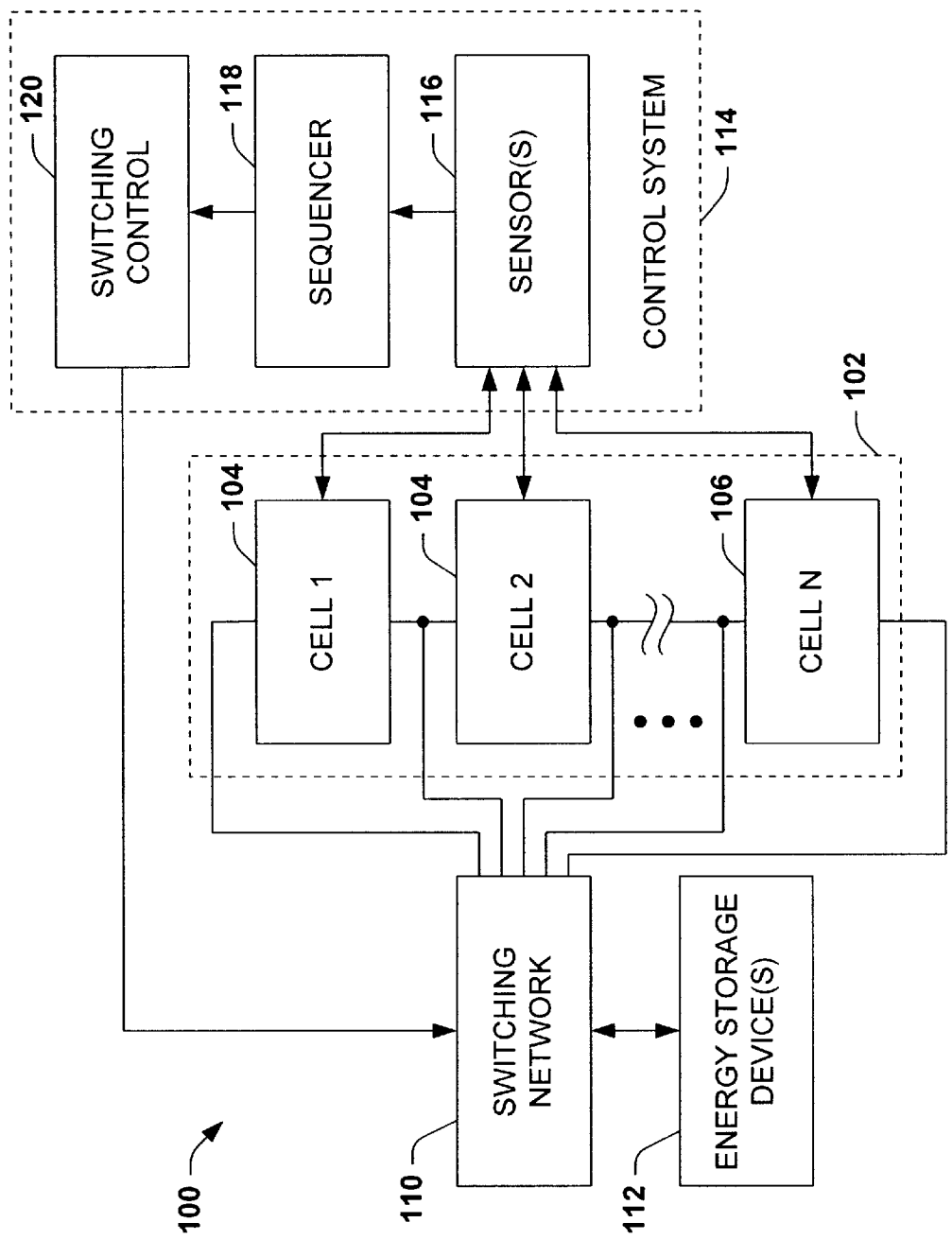
FIG. 4 is a functional block diagram of a cell balancing system in accordance with an aspect of the present invention.

FIG. 4 illustrates another example of a cell balancing system 100 in accordance with an aspect of the present invention. The system 100 includes a cell stack 102 having a plurality of battery cells 104, 106 and 108 connected in series. A switching network 110 is connected between one or more energy storage devices 112 and the respective cells 104, 106 and 108. The switching network 110 is operative to selectively electrically connect the energy storage device 112 to a desired one of the cells 104, 106, 108 to enable energy transfer between the storage device and connected cell.

A control system 114 is connected to the switching network 110 to control operation of the switching network 110. The control system 114 is programmed and/or configured to control the switching network 110 and in turn balancing of the cell voltages, such as based on one or more sensed conditions of the cells 104, 106 and 108.

By way of example, the control system 114 includes one or more sensors 116 operatively connected to the respective cells 104, 106 and 108. The sensor 116, for example, can be a voltage sensor operative to determine an indication of the voltage across each cell 104, 106, 108. The sensor 116 provides information indicative of the voltage of each cell to a sequencer 118.

The sequencer 118 is programmed and/or configured to determine how to connect the respective cells 104, 106, 108 to the energy storage device 112 based on the sensed condition (e.g., voltage) of the cells. For example, the sequencer 118 can include a comparator that compares the relative voltages between the cells to discern a relationship between the voltage potentials of the cells 104, 106 and 108 and ranks the cells accordingly. The sequencer 118 can employ the ranking of cell voltage potentials to determine a desirable order in which the cells are to be connected with the associated storage device 112. Alternatively, the sequence can be fixed based on the arrangement and configuration of cells 104, 106, and 108.

A switching control 120 controls operation of the switching network 110 based on information from the sequencer 118. The switching control 120, for example, includes circuitry that provides a plurality of outputs, each being operative to activate and deactivate an associated switch device (e.g., transistor) according to which cell is to be connected with the energy storage device based on sequencer information. The switching control 120, thus, connects the storage device 112 mutually exclusively with each of the cells 104, 106, 108 based on the sequence.

By way of example, it may be desirable to first connect a cell having the highest voltage potential with the storage device 112 and next the cell having the lowest voltage potential. After the cells having the two opposed extreme voltages (e.g., highest and lowest voltages) are balanced, the sequencer 118 can include the other cells in the switching sequence scheme. Alternatively, the sequencer 118 could group selected cells into pairs or other numbers of cells, with each cell in an associated group being sequentially connected with the energy storage device for a duration to facilitate balancing of voltages across the cells in that group. The sequencer 118 further could dynamically modify which cells belong to a given group as a function of the condition sensed by the sensor 116. It is also to be understood and appreciated that a different energy storage device can be used for each group so that balancing of voltages in different groups of cells can occur concurrently.

When the voltages in the cells 104, 106 and 108 have been balanced (e.g., substantially equal in magnitude), the sequencer 118 can provide sequencing information to the switching control 120 so as to control the switching network 110 to maintain a disconnect between the cells 104, 106 and 108 and the energy storage device. Alternatively, the switching network 110 can continue to connect the cells 104, 106, and 108 sequentially with the energy storage device 112, although little or no transfer will occur due to the balanced condition of the respective cells.

As described herein, the system 100 operates to transfer energy from cells 104, 106, 108 having a higher potential energy to cells having a lower potential energy. Because the energy is transferred between such cells through another storage device, it is to be appreciated that little energy is dissipated, in contrast to most conventional systems.

Furthermore, the total power dissipation is low enough that the systems can run continuously and the draw is not significant relative to battery self discharge. Alternatively, the balancing process can be terminated (temporarily) after a sufficiently balanced condition exists among the cells 104, 106 and 108 based on the sensed condition (e.g., voltage) of the cells).

Figure 5:
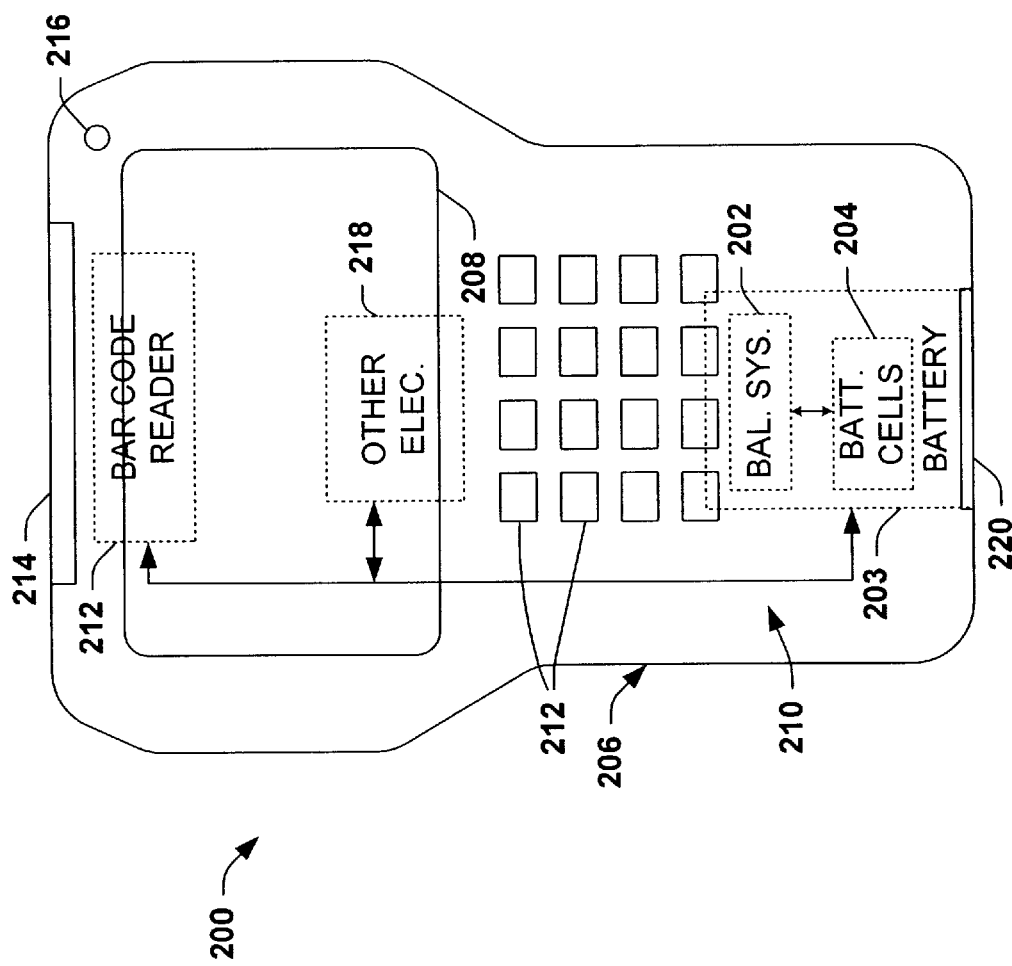
FIG. 5 is a top view of an example of a portable electronic device incorporating a cell balancing system in accordance with an aspect of the present invention.

FIG. 5 illustrates an example of a hand-held portable device 200 that can implement a cell balancing system 202 in accordance with an aspect of the present invention. The cell balancing system is implemented as part of a battery pack 203 that includes a plurality of energy cells 204, such as a cell stack. For example, the portable device 200 could be a laptop or notebook computer, a Personal Digital Assistant (PDA), a bar code reader, a cellular telephone, a pager, laptop computer, or other battery powered, portable electronic device.

In the example of FIG. 5, the device 200 includes a housing 206 that contains electronic circuitry for implementing device. The housing 206 is depicted as an elongated enclosure of a size and includes such contours as to conveniently fit into the open palm of the user, although those skilled in the art will understand and appreciate various other sizes and configurations that could be utilized in accordance with an aspect of the present invention. A display screen 208 and a keypad 210 are located at a common side of the housing 206. The keypad 210 includes a set of user interface keys 212 for allowing the user to input information and/or operational commands. The user interface keys 212 can include a full alphanumeric keypad, function keys, enter keys, etc.

The display 208 can be a liquid crystal display (LCD) or the like. The display 208 is operable to display data or other information relating to ordinary operation of the portable electronic device 200. The display 208 also could be a touch screen, able to receive user information as well as display information. Peripheral devices, such as a printer, signature pad, magnetic stripe reader, touch panel, and bar code scanner can also be coupled to the portable electronic device 200 so as to be powered by the cell stack 204 of the device.

In a particular aspect, the device 200 can include a bar code reader 212 and a window 214 through which a bar code reader is able to read a bar code presented to the device 200. The bar code reader 212, for example, is adapted to read information on a bar code label or the like. The battery 204 also powers the bar code reader 212, such as through a power bus. The device 200 can include an indicator (e.g., a LED) 216 that is illuminated to reflect whether the bar code has been properly or improperly read.

The battery pack 203, which is removably received in a slot 220 at an end of the housing 206, stores electrical energy for use in operating the device 200. The battery pack 203 includes the cell balancing system 202 and cell stack 204. The cell balancing system 202 helps maintain individual cells of the stack 204 at (or near) a balanced voltage potential.

For example, the balancing system 202 includes an array of switches connected between the battery 204 and the associated storage device of the balancing system. The switches are operative to sequentially connect respective cells of the pack with an associated energy storage device, such as includes one or more capacitor. By sequentially connecting the individual energy cells with the energy storage device 202 in a mutually exclusive manner, energy is repeatedly transferred from cells having a higher potential energy to cells having a lower potential energy through the storage device. As a result of such transfers, the potential energy of the respective cells balances between the cells over time, prolonging the operation time for the associated electronics 214, 216, 218 of the device 200.

Figure 6:
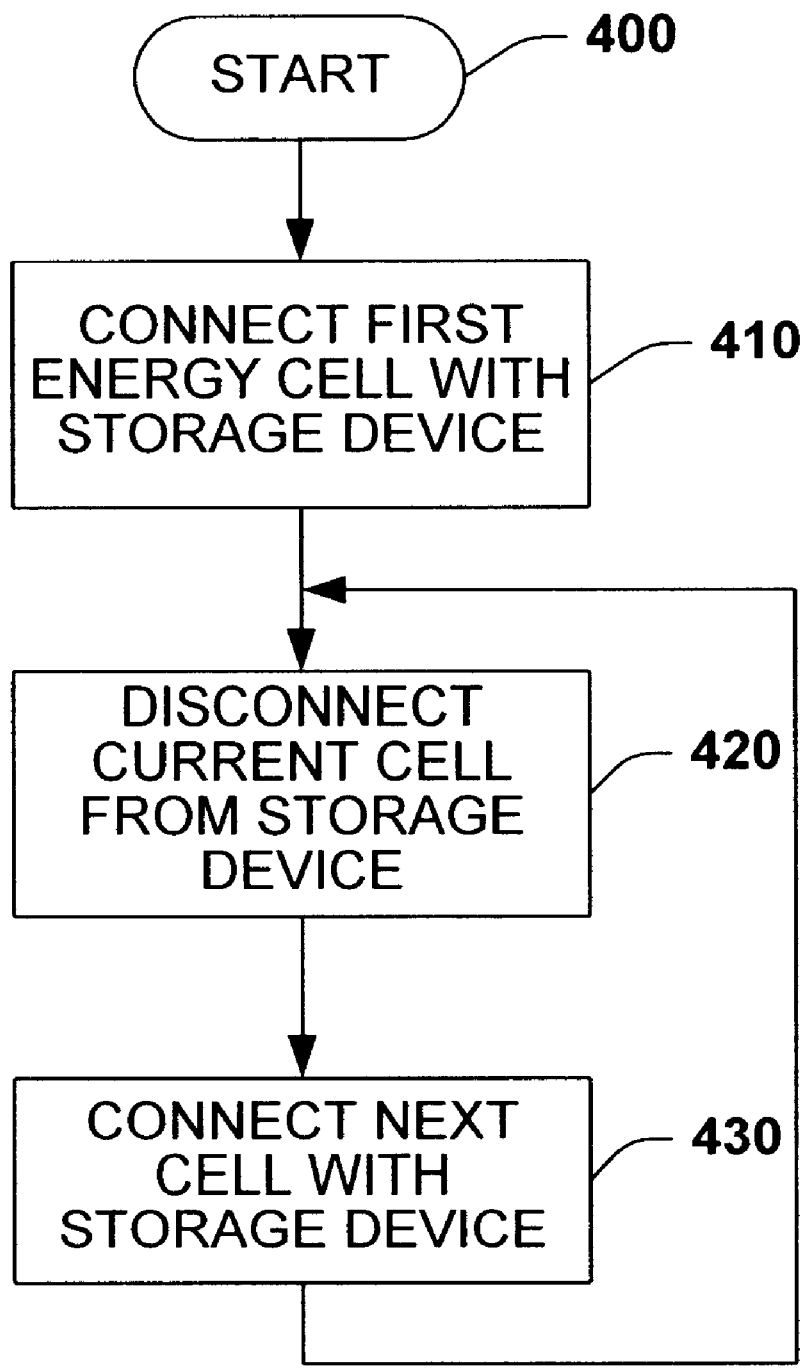
FIG. 6 is a flow diagram illustrating a methodology for balancing voltage across a plurality of energy cells in accordance with an aspect of the present invention.
Figure 7:
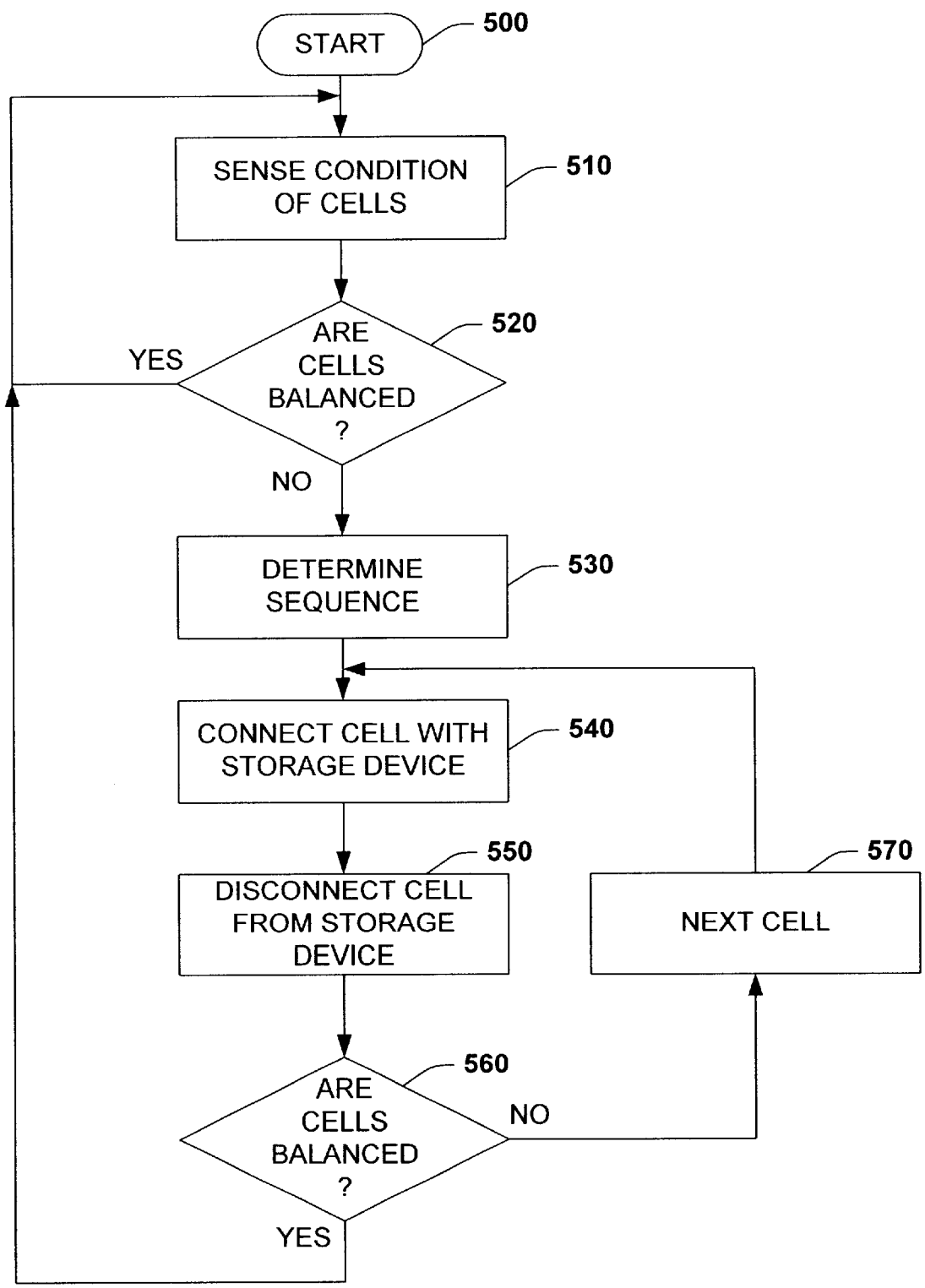
FIG. 7 is a flow diagram illustrating methodology for selectively balancing voltage across a plurality of energy cells in accordance with an aspect of the present invention.

In view of the foregoing structural and functional features described above, a methodology in accordance with various aspects of the present invention will be better appreciated with reference to FIGS. 6 and 7. While, for purposes of simplicity of explanation, the methodologies of FIGS. 6 and 7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the certain parts of the methodology can be implemented as computer-executable instructions, such as software stored in a computer-readable medium. Alternatively, the methodology may be implemented as hardware or a combination of hardware and software.

FIG. 6 illustrates a basic methodology for balancing energy among a plurality of battery cells in accordance with an aspect of the present invention. The methodology begins at 400, in which the system is initialized to its starting condition. Next, at 410, a first of the plurality of cells is connected with an associated energy storage device for a time period. During the connection, energy is transferred between the storage device and cell according to the relative potential energy between the storage device and cell. After the duration, the current cell is disconnected from the storage device at 420. From 420 the methodology proceeds to 430 in which the next cell is connected with the storage device. From 430, the methodology returns to 420 in which the current cell, which was connected at 420, is disconnected from the storage device. The methodology thus repeats through 420 and 430 so that the respective cells are each connected sequentially with and disconnected from the storage device. As a result, the electrical energy from cells having a higher voltage potential is transferred to cells having a lower voltage potential until a balanced energy condition exists between the cells.

FIG. 7 illustrates another example of a methodology for balancing voltages in cells of a multi-cell stack, such as form part of a battery pack, in accordance with one aspect of the present invention. The methodology begins at 500, in which variables and parameters are set to their initial values. Next, at 510, a condition of the cells is sensed, such as the relative potential energy (e.g., voltage) of the cells. At 520, a determination is made as to whether the potential energy between the cells is substantially balanced, such as having respective voltages all within an expected range of each other. If the determination is positive, indicating that the cells are sufficiently balanced, the methodology returns to 510. Thus, so long as the cells remain substantially balanced, no additional action is required. If the determination is negative, indicating an imbalance between two or more cells, the methodology proceeds to 530.

At 530, a sequence is determined for implementing balancing of the cell energy in accordance with an aspect of the present invention. The sequence can be predetermined sequence or it can be derived as a function of the condition sensed at 510. Next, at 540, a selected cell of the sequence is connected with the storage device, which can be one or more capacitors. The connection results in a transfer of electrical energy between the storage device and the connected cell according to the relative potential energy of each. The connection is maintained for a duration, which can be a fixed time period or variable, based on a clock or timer (e.g., from a clock of an associated battery gas gauge). After the duration, the cell is disconnected from the storage device at 550.

At 560, a determination is made as to whether cells are balanced. For example, the determination can be implemented based on the condition sensed at 510. If the determination at 560 is negative, indicating that the cells are not balanced, the methodology proceeds to 570 in which the next cell in the sequence of cells is selected. From 570 the methodology returns to 540 and 550 to implement the associated connecting and disconnecting functions between the next cell and the storage device. If the determination at 560 is positive, indicating that the cells are balanced, the methodology returns to 510. For example, when the cells are determined to be balanced, such as when the voltages of each of the cells is within an expected voltage range of each other, the cell balancing loop of 540, 550, and 570 can be interrupted to terminate the loop. It is to be understood and appreciated that the foregoing methodologies can be implemented, for example, when the device is charging, during a sleep mode, and/or during use.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A cell balancing system, comprising:
    a plurality of interconnected energy cells;
    an energy storage device; and
    a transfer system coupled to each of the power cells and operative to intermittently, for a predetermined duration based on a clock signal, connect the energy storage device across each of the power cells to balance the electrical potential across the energy cells.

2. The system of claim 1, the energy storage device comprising at least one capacitor.

3. The system of claim 1, the energy cells further comprising a plurality of battery cells connected in series to form at least one cell stack.

4. The system of claim 1, the transfer system farther comprising a switch network.

5. The system of claim 4, the switch network comprising a plurality of switch devices, selected ones of the switch devices being operative to mutually exclusively connect each of the energy cells in parallel with the energy storage device.

6. The system of claim 1, further comprising a control system that controls operation of the energy transfer system to selectively connect the power cells with the energy storage device.

7. The system of claim 6, the control system further comprising a sequencer that determines a sequence for connecting each of the energy cells with the energy storage device.

8. A system for balancing energy among a plurality of cells, comprising:
    an energy storage device,
    a switching system operative to sequentially connect and disconnect the energy storage device relative to each of a plurality of cells so that electrical energy is transferred between the energy storage device and the cell connected across the energy storage device, whereby the transfer of energy results in balancing electrical energy among the plurality of energy cells; and
    a clock that provides a clock signal the switching system connecting and disconnecting the energy storage device relative to the respective energy cells based on the clock signal.

9. The system of claim 8, the energy storage device further comprising a capacitor.

10. A power system for a handheld electronic device, comprising:
    a plurality of energy cells connected in series;
    an associated energy storage device having end terminals; and
    an energy transfer system operatively connected between the energy storage device and the plurality of energy cells, the energy transfer system being operative to selectively electrically connect the end terminals of the energy storage device across each respective one of the plurality of energy cells, such that energy is transferred between the energy storage device and each of the energy cells connected to the energy storage device according to the relative potential energy of the energy storage device and the power cell connected thereto.

11. The system of claim 10, further comprising a control system that controls operation of the energy transfer system to selectively connect the energy storage device across each respective one of the plurality of energy cells according to a sequence.

12. The system of claim 11, further comprising a sensor that senses energy of each of the plurality of energy cells and provides a signal indicative of the sensed energy, the control system deter mining the sequence based on the signal indicative of the sensed energy.

13. The system of claim 11, the sequence being a predefined sequence of the plurality of energy cells.

14. The system of claim 10, further comprising other electronics operatively connected to the plurality of energy cells to receive electrical energy for operating the electronic device.

15. A system for balancing energy among a plurality of energy cells, comprising;
    power means for charging and discharging electrical energy,
    means for sequentially connecting the power means with each of the plurality of energy cells to transfer electrical energy between the storage means and the respective cell connected with the storage means, whereby the sequential transfer of energy between the storage means and the energy cells results in balancing electrical energy among the plurality of energy cells and
    switching means for connecting and disconnecting the storage means relative to each of the plurality of energy cells based on a clock signal.

16. The system of claim 15, further comprising means for controlling a sequence in which the power means is connected to each of the plurality of energy cells.

17. A method for balancing electrical energy among a plurality of energy cells, comprising:
    repeatedly connecting and disconnecting; for a predetermined duration based on a clock signal; each of the plurality of energy cells relative to a common energy storage device to transfer electrical energy therebetween.

18. The method of claim 17, the energy storage device being at least one capacitor.

19. The method of claim 17, further comprising the repeatedly connecting and disconnecting occurring according to a sequence.

20. The method of claim 19, further comprising sensing a condition of the plurality of energy cells, the sequence being determined based on the sensed condition.

21. The method of claim 17, further comprising sensing a condition of the plurality of energy cells, and terminating the method after the sensed condition indicates that the plurality of energy cells are sufficiently balanced.

* * * * *